(12) United States Patent
Liu et al.

(10) Patent No.: US 10,391,479 B2
(45) Date of Patent: Aug. 27, 2019

(54) HYDROCRACKING CATALYST, PREPARATION METHOD AND USE THEREOF, AND METHOD FOR HYDROCRACKING CATALYTIC DIESEL OIL

(71) Applicants: China Petroleum & Chemical Corporation, Beijing (CN); Fushun Research Institute of Petroleum and Petrochemicals, SINOPEC CORP., Fushun, Liaoning (CN)

(72) Inventors: Wei Liu, Liaoning (CN); YanZe Du, Liaoning (CN); Bo Qin, Liaoning (CN); FengLai Wang, Liaoning (CN); XiaoPing Zhang, Liaoning (CN); Hang Gao, Liaoning (CN)

(73) Assignees: China Petroleum & Chemical Corporation, Beijing (CN); Fushun Research Institute of Petroleum and Petrochemicals, SINOPEC CORP., Fushun, Liaoning (CN)

( * ) Notice: Subject to any disclaimer, the term of this patent is extended or adjusted under 35 U.S.C. 154(b) by 229 days.

(21) Appl. No.: 15/349,361

(22) Filed: Nov. 11, 2016

(65) Prior Publication Data

US 2017/0128919 A1 May 11, 2017

(30) Foreign Application Priority Data

Nov. 11, 2015 (CN) .......................... 2015 1 0761618

(51) Int. Cl.

| | |
|---|---|
| B01J 35/10 | (2006.01) |
| B01J 37/08 | (2006.01) |
| B01J 29/16 | (2006.01) |
| B01J 37/02 | (2006.01) |
| C10G 65/10 | (2006.01) |
| B01J 35/00 | (2006.01) |
| C10G 47/02 | (2006.01) |
| B01J 29/08 | (2006.01) |

(52) U.S. Cl.
CPC ........... *B01J 29/166* (2013.01); *B01J 35/002* (2013.01); *B01J 35/1019* (2013.01); *B01J 35/1038* (2013.01); *B01J 37/0201* (2013.01); *B01J 37/082* (2013.01); *C10G 47/02* (2013.01); *C10G 65/10* (2013.01); *B01J 2029/081* (2013.01); *B01J 2229/16* (2013.01); *B01J 2229/20* (2013.01); *B01J 2229/26* (2013.01); *B01J 2229/32* (2013.01); *B01J 2229/34* (2013.01); *B01J 2229/40* (2013.01); *B01J 2229/42* (2013.01)

(58) Field of Classification Search
None
See application file for complete search history.

(56) References Cited

U.S. PATENT DOCUMENTS

| | | | |
|---|---|---|---|
| 3,446,865 A | 5/1969 | Roth | |
| 2002/0094931 A1 | 7/2002 | Wang et al. | |
| 2003/0173256 A1* | 9/2003 | Fujikawa | ................. B01J 23/85 208/217 |
| 2013/0303816 A1 | 11/2013 | Jan et al. | |

FOREIGN PATENT DOCUMENTS

| | | | |
|---|---|---|---|
| CN | 101380589 A | | 3/2009 |
| CN | 101450319 A | | 6/2009 |
| CN | 103041842 A | | 4/2013 |
| CN | 103372457 A | | 10/2013 |
| CN | 105618115 | * | 6/2016 |
| CN | 105618115 A | | 6/2016 |
| CN | 105642335 | * | 6/2016 |
| CN | 105642335 A | | 6/2016 |
| CN | 105709801 A | | 6/2016 |
| EP | 2404667 | * | 1/2012 |
| EP | 2404667 A1 | | 1/2012 |
| EP | 2692429 A1 | | 2/2014 |
| EP | 2692429 | * | 5/2014 |
| WO | 2009126278 A2 | | 10/2009 |

OTHER PUBLICATIONS

Chinese Patent Office, First Search Report for Chinese application No. 201510761618.4, dated Oct. 19, 2018.

* cited by examiner

*Primary Examiner* — Melvin C. Mayes
*Assistant Examiner* — Colette B Nguyen
(74) *Attorney, Agent, or Firm* — Novick, Kim & Lee, PLLC; Allen Xue

(57) ABSTRACT

The present disclosure provides a hydrocracking catalyst, a method for preparing the same and a use of the same, and a method for hydrocracking catalytic diesel oil. The catalyst comprises a support, an active metal component, and carbon, wherein, based on the total weight of the catalyst, the content of the support is 60 to 90 wt %, the content of the active metal component calculated in metal oxides is 15 to 40 wt %, and the content of carbon calculated in C element is 1 to 5 wt %; measured with an infrared acidimetric estimation method, the acid properties of the hydrocracking catalyst are: the total infrared acid amount is 0.4 to 0.8 mmol/g, wherein, the infrared acid amount of strong acid with desorption temperature greater than 350° C. is 0.08 mmol/g or lower, and the ratio of the total infrared acid amount to the infrared acid amount of strong acid with desorption temperature greater than 350° C. is 5 to 50.

13 Claims, No Drawings

HYDROCRACKING CATALYST, PREPARATION METHOD AND USE THEREOF, AND METHOD FOR HYDROCRACKING CATALYTIC DIESEL OIL

CROSS REFERENCE TO RELATED APPLICATION

This application claims priority to Chinese Application No. 201510761618.4 filed on Nov. 11, 2015, titled "Catalytic Diesel Oil Hydrocracking Catalyst and Method for Preparing the same", which is specifically and entirely incorporated by reference.

FIELD OF THE INVENTION

The present invention relates to the catalytic diesel oil hydrocracking field, in particular to a hydrocracking catalyst, a method for preparing the hydrocracking catalyst and a use of the hydrocracking catalyst, and a method for hydrocracking catalytic diesel oil.

BACKGROUND OF THE INVENTION

In recent years, as the crude oil processed in China is heavier increasingly, the raw materials processed by catalytic cracking are heavier and poorer; in addition, many enterprises have renovated their catalytic cracking plants or increased the operating severity of their catalytic cracking plants in order to attain a purpose of improving gasoline quality or increasing the yield, resulting in poorer quality of products obtained by catalytic cracking, especially catalytic diesel oil.

New hydrocracking processes and techniques for producing naphtha components and low-sulfur clean diesel fuel with a high added value by means of hydro-conversion of diesel oil with high aromatic content have good application prospects, in order to improve the utilization of petroleum resources, improve the overall level of quality of gasoline and diesel fuels, attain an objective of optimized product bending and maximized product value, and meet the increasing demand for clean fuels in China. Domestic and foreign researchers have also made extensive researches. There are reports on conversion of catalytically cracked light cycle oils into blended extra-low-sulfur diesel and high-octane gasoline components with hydrocracking techniques in foreign countries. For example, on the NPRA Annual Seminar 1995, David A. Pappal et al. introduced a single-stage hydrocracking process developed by Mobil, Akzo Nobel/Nippon Ketjen, and M. W. Kellogg. On the NPRA Annual Seminar 2005, Vasant P. Thakkar et al. introduced the LCO Unicracking™ technique developed by UOP. It is reported that both techniques can be used to convert low-value catalytic cycle oils into blended high-octane gasoline component and high-quality diesel component.

A key point in the catalytic diesel oil hydro-conversion process and technique is to accomplish ring-opening and cracking of di-aromatic hydrocarbons and tri-aromatic hydrocarbons in the catalytic diesel fraction while keeping the mono-aromatic hydrocarbons in the gasoline fraction and reducing ring-opening reaction of the aromatic hydrocarbons in the gasoline fraction and the gas produced through further cracking as far as possible, and thereby improve the yield and octane number of the gasoline product.

In addition, as that technique is applied in industrial application, the catalytic diesel oil conversion technique exhibits some drawbacks in industrial application: Firstly, compared with other hydrocracking techniques and processes, the catalytic diesel oil hydro-conversion technique (FD2G) and process results severe deviation in product distribution and product quality from the design objectives in the initial stage of operation, i.e., the octane number of the gasoline product and the gasoline yield are obviously lower than the desired targets; as the production time extends, the product distribution and the quality of gasoline product are gradually improved, till they reach a good and relatively stable level; however, that process is very long (usually longer than 1 month).

Secondly, compared with conventional hydrocracking techniques, in the catalytic diesel oil hydro-conversion technique, reaction raw materials have poor quality and high contents of di-aromatic hydrocarbons and tri-aromatic hydrocarbons; moreover, the reaction conditions are demanding. Consequently, the catalyst deactivation rate in the catalytic diesel oil hydro-conversion process is much higher than that in conventional hydrocracking processes, resulting in a shortened operation cycle, and bringing difficulties to production scheduling in the plant.

CN105642335A has disclosed a method for preparing a hydrocracking catalyst, comprising: (1) selecting a hydrocracking catalyst support material, which contains at least one acidic cracking material, adding an acidic peptizing agent into the support material, and preparing a hydrocracking catalyst support through molding, drying, and roasting; (2) preparing a saline solution with 10 to 30 g/100 ml active metal content, impregnating the hydrocracking catalyst support prepared in the step (1) in the saline solution in a saturated state, and then drying and roasting the hydrocracking catalyst support; (3) impregnating the roasted catalyst obtained in the step (2) in a liquid olefin in a saturated state, and heating the impregnated catalyst at 50 to 400° C. for 1 to 70 h in air, so that a carbon deposition reaction happens on the catalyst and thereby a carbonized catalyst is obtained; (4) loading the carbonized catalyst support prepared in the step (3) directly into a muffle furnace preheated to 400 to 600° C., and roasting for 5 to 200 minutes, to burnt off the carbon deposit on the surface layer of the catalyst support, so that the carbon amount in the support accounts for 10 to 90% of the total carbon amount before the catalyst support is roasted; (5) preparing a saline solution with 40 to 80 g/100 ml active metal content, impregnating the roasted catalyst support obtained in the step (4) in the saline solution in a saturated state, and then drying and roasting, to obtain a finished product of hydrocracking catalyst. In that method, the active metal is impregnated in two steps, to form gradient distribution of active metal on the catalyst, wherein, the active metal content in the surface layer of the catalyst is higher than the active metal content in the core part of the catalyst; thus, the catalyst can be used to process wax oil raw material to produce chemical raw materials such as tail oil and heavy naphtha, etc., increase the hydrogenation saturation rate of the macromolecular tail oil and decrease the saturation rate of the generated naphtha fraction, and thereby improve the reaction selectivity. However, the catalyst is not applicable to catalytic diesel oil hydrocracking.

It can be seen that there are drawbacks in the prior art, including: poor reaction effect of fresh catalyst in the initial stage of operation, and poor catalyst stability.

SUMMARY OF THE INVENTION

To overcome the above-mentioned drawbacks in the catalytic diesel oil hydrocracking process in the prior art, the present invention provides a hydrocracking catalyst, a preparation method and an application of the hydrocracking catalyst, and a catalytic diesel oil hydrocracking method.

To attain the objectives described above, the present invention provides a hydrocracking catalyst, wherein the hydrocracking catalyst comprises a support, an active metal component, and carbon, wherein, based on the total weight of the hydrocracking catalyst, the content of the support is 60 to 90 wt %, the content of the active metal component calculated in metal oxides is 15 to 40 wt %, and the content of carbon calculated in C element is 1 to 5 wt %; measured with an infrared acidimetric estimation method, the acid properties of the hydrocracking catalyst are: the total infrared acid amount is 0.4 to 0.8 mmol/g, wherein, the infrared acid amount of strong acid with desorption temperature greater than 350° C. is 0.08 mmol/g or lower, and the ratio of the total infrared acid amount to the infrared acid amount of strong acid with desorption temperature greater than 350° C. is 5 to 50.

The present invention further provides a method for preparing a hydrocracking catalyst, comprising the following steps: (1) controlling a support to contact with a carbon source and have carbon deposition reaction, to obtain a carbonized support; (2) roasting the carbonized support in an oxygen-containing gas, to obtain a decarbonized support, in which the carbon content is 20 to 80% of the carbon content in the carbonized support, wherein, the oxygen content in the oxygen-containing gas is 0.5 to 8 vol %, the roasting temperature is 250° C. to 390° C., and the roasting time is 3.5 to 20 h; (3) introducing a precursor of active metal component into the decarbonized support, and drying the decarbonized support; (4) treating the product obtained in the step (3) through a heat treatment process, in which the precursor of active metal component is converted into active metal oxides, and the carbon in the decarbonized support is kept; wherein, the hydrocracking catalyst contain 1 to 5 wt % carbon calculated in C element, and the support and the precursor of active metal component are dosed in a way that the hydrocracking catalyst contains 60 to 90 wt % support and 15 to 40 wt % active metal component calculated in metal oxides.

The present invention further provides a hydrocracking catalyst prepared with the method according to the present invention.

The present invention further provides a use of the hydrocracking catalyst according to the present invention in diesel oil hydrocracking reaction.

The present invention further provides a method for hydrocracking catalytic diesel oil, comprising: (a) pre-treating catalytic diesel oil by hydrocracking; and (b) treating the product obtained in the step (a) by hydrocracking in the presence of the hydrocracking catalyst according to the present invention and hydrogen.

In the present invention, first, a support that contacts with a carbon source is controlled to have carbon deposition reaction in an oxygen-containing atmosphere, so that the carbon source covers the acid sites on the support; then, the carbonized support is roasted slowly at a low temperature in an oxygen-containing gas that has low oxygen content, to selectively burnt off the carbon deposit on non-strong acid, so that the obtained decarbonized support has an appropriate infrared acid distribution structure; next, the support is impregnated with active metal to obtain a hydrocracking catalyst; finally, the hydrocracking catalyst is roasted at a high temperature in an inert atmosphere for a long time or roasted at a low temperature in an oxygen-containing atmosphere for a long time, to obtain a hydrocracking catalyst with certain carbon content kept in it ultimately.

With the above-mentioned technical scheme, the hydrocracking catalyst provided in the present invention has rational infrared acid intensity distribution and appropriate dispersion of active metal component, and can remarkably improve the reaction effect of the hydrocracking catalyst in the initial stage of operation while obviously improve the yield of gasoline product, total liquid yield, and octane number of gasoline product, when the hydrocracking catalyst is used in catalytic diesel oil hydrocracking reaction. In addition, the catalyst maintains good catalytic stability during the operation.

Other features and advantages of the present invention will be further detailed in the embodiments hereunder.

DETAILED DESCRIPTION

Hereunder some embodiments of the present invention will be detailed. It should be appreciated that the embodiments described here are only provided to describe and explain the present invention, but shall not be deemed as constituting any limitation to the present invention.

The ends points and any value in the ranges disclosed in the present invention are not limited to the exact ranges or values. Instead, those ranges or values shall be comprehended as encompassing values that are close to those ranges or values. For numeric ranges, the end points of the ranges, the end points of the ranges and the discrete point values, and the discrete point values can be combined to obtain one or more new numeric ranges, which shall be deemed as having been disclosed specifically in this document.

The present inventor has found in the research: in the process of producing high-octane gasoline by hydro-conversion of catalytic diesel oil, the catalyst deactivation rate may be increased easily and causes secondary cracking and hydrogenation saturation of the generated gasoline fraction and decreased octane number and yield of gasoline, if the acidity distribution of the hydrocracking catalyst is irrational, e.g., the infrared acid amount is high, especially the content ratio of strong acid with desorption temperature greater than 350° C. is too high, because the catalytic diesel oil raw material has rich content of substances that have a trend of coke formation (e.g., aromatic hydrocarbons and nitrides, etc.) and the hydrocracking reaction conditions are more demanding (low pressure, high temperature). If the acid amount in the catalyst is too low, the aromatic hydrocarbon conversion capability will be compromised, and thereby the product quality will be degraded. In addition, if the acid amount is too low, the catalyst reactivity will be decreased; consequently, the reaction temperature has to be improved in the operation in order to reach the same reaction depth, resulting in increased thermal cracking and decreased yield of $C_5^+$ liquid. Based on the above-mentioned research finding, the inventor puts forward the present invention.

The present invention provides a hydrocracking catalyst, wherein the hydrocracking catalyst comprises a support, an active metal component, and carbon, wherein, based on the total weight of the hydrocracking catalyst, the content of the support is 60 to 90 wt %, the content of the active metal component calculated in metal oxides is 15 to 40 wt %, and the content of carbon calculated in C element is 1 to 5 wt %; measured with an infrared acidimetric estimation method, the acid properties of the hydrocracking catalyst are: the total infrared acid amount is 0.4 to 0.8 mmol/g, wherein, the infrared acid amount of strong acid with desorption temperature greater than 350° C. is 0.08 mmol/g or lower, and the ratio of the total infrared acid amount to the infrared acid amount of strong acid with desorption temperature greater than 350° C. is 5 to 50.

In the present invention, the sum of the contents of the components in the catalyst is 100%.

In a preferred embodiment of the present invention, based on the total weight of the hydrocracking catalyst, the content of the support is 60 to 90 wt %, the content of the active metal component calculated in metal oxides is 15 to 40 wt %, and the content of carbon calculated in C element is 1 to 3 wt %.

In another preferred embodiment of the present invention, based on the total weight of the hydrocracking catalyst, the content of the support is 60 to 85 wt %, the content of the active metal component calculated in metal oxides is 15 to 40 wt %, and the content of carbon calculated in C element is 1 to 3 wt %.

In the present invention, preferably, measured with an infrared acidimetric estimation method, the acid property of the hydrocracking catalyst is: the total infrared acid amount is 0.4 to 0.6 mmol/g; the ratio of the total infrared acid amount to the infrared acid amount of strong acid with desorption temperature greater than 350° C. is 8 to 30, preferably is 10 to 25, more preferably is 20 to 25.

In the present invention, the infrared acidimetric estimation method employs pyridine adsorption infrared spectrometry, and the measurement is made with a Nicolet 6700 FTIR spectrometer from NICOLET (a US company); the process is as follows:

20 mg ground sample (in particle size smaller than 200 mpi) is pressed into a thin flake in 20 mm diameter, and loaded onto a sample holder of an absorption cell, 200 mg sample (in flake shape) is loaded into a cup hung to the lower end of a quartz spring (the spring length $x_1$ (mm) is logged before the sample is loaded), the absorption cell is connected to an adsorption tube, vacuumed to $4 \times 10^{-2}$ Pa vacuum level, heated up to 500° C. and kept at the temperature for 1 h, to remove the adsorbed substance on the surface of the sample (the spring length $x_2$ (mm) after the sample is purified is logged); then, the sample is cooled down to room temperature, absorbs pyridine to saturated state, and heated up to 160° C. and held at the temperature for 1 h, to desorb the pyridine absorbed physically (the spring length $x_3$ (mm) after the sample absorbs pyridine is logged); the total acid amount is calculated with a pyridine gravimetric adsorption method; in the same way, the sample is heated up to 350° C. and held for 1 h, to desorb the pyridine absorbed physically (the spring length $x_4$ (mm) after the sample absorbs pyridine is logged); the amount of strong acid with Desorption temperature greater than 350° C. is calculated with a pyridine gravimetric adsorption method.

Wherein, the total acid amount is calculated with a pyridine gravimetric adsorption method as follows:

According to Hooke's law (the relation between spring elongation and stress): $f=k\Delta x$ When the spring is placed vertically: $m=k\Delta x$ Where, m is the mass of the sample, g; $\Delta x$ is the elongation of the spring, mm; k is the stiffness coefficient of the spring.

$$\frac{Mass\_of\_Absorbed\_Pyrindine/79.1}{Total\_Acid} = \frac{Mass\_of\_Sample}{1\ g}$$

Total acid amount C (unit: mmol/g):

$$C = \frac{k(x_3 - x_2)}{k(x_2 - x_1) \times 79.1} mol/g = \frac{x_3 - x_2}{x_2 - x_1} \times \frac{1}{79.1} mol/g = 12.64 \times \frac{x_3 - x_2}{x_2 - x_1} mmol/g$$

Note: 79.1 is the mole mass of pyridine, in unit of g/mol.

According to the present invention, preferably, the support is a silica-alumina support that contains a modified Y-type molecular sieve, and, based on the total weight of the support, the support contains 20 to 85 wt % modified Y-type molecular sieve and 15 to 80 wt % amorphous silica-alumina and/or alumina. Preferably, the support contains 30 to 70 wt % modified Y-type molecular sieve and 30 to 70 wt % amorphous silica-alumina and/or alumina.

According to the present invention, there is no particular restriction on the modified Y-type molecular sieve. Preferably, the modified Y-type molecular sieve is selected from a Y-type molecular sieve obtained through dealumination and silicon reinsertion and/or hydrothermal treatment of ammonium fluosilicate, and the molar ratio of $SiO_2/Al_2O_3$ in the modified Y-type molecular sieve is (5 to 15):1.

In the present invention, the hydrocracking catalyst is a bi-functional catalyst, and the support provides acidity, i.e., provides acidic catalytic sites. In the hydrocracking catalyst provided in the present invention, the support surface is at least partially covered by carbon; thus, the acidity distribution on the surface of the support can be adjusted. When the hydrocracking catalyst provided in the present invention is applied in hydrocracking reaction of diesel oil (especially catalytic diesel oil), it can achieve better catalytic activity and reaction stability, and can improve the yield of gasoline product, total liquid yield, and octane number of gasoline product.

According to the present invention, the active metal component is used as an active component in the hydrocracking catalyst. Preferably, the metal in the active metal component is selected from VIII metal elements and/or VIB metal elements.

Preferably, the VIII metal elements are Ni and/or Co, and the VIB metal elements are W and/or Mo.

More preferably, the content of the VIII metal elements calculated in metal oxides is 2 to 15 wt %, and the content of the VIB metal elements calculated in metal oxides is 10 to 30 wt %.

According to the present invention, the active metal component is carried on at least a part of the surface of the support. The degree of dispersion of the active metal component on the surface of the hydrocracking catalyst may be expressed by the atomic ratio of the active metal component to the Al element on the surface of the hydrocracking catalyst. In a preferred embodiment, on the surface of the catalyst, the atomic ratio of the VIII metal elements to Al element is (0.2 to 0.5):1, preferably is (0.2 to 0.4):1.

In another preferred embodiment, on the surface of the catalyst, the atomic ratio of the VIB metal elements to Al element is (0.4 to 0.8):1, preferably is (0.4 to 0.6):1.

In the present invention, the degree of dispersion may be measured by measuring the atomic ratio of Ni (Co)/Al or atomic ratio of Mo (W)/Al on the surface of the hydrocracking catalyst by X-ray photoelectron spectroscopy.

According to the present invention, preferably, the specific surface area of the hydrocracking catalyst is 200 to 400 $m^2/g$, and the pore volume is 0.25 to 0.38 ml/g.

The hydrocracking catalyst provided in the present invention has appropriate acid intensity distribution and appropriate dispersion of active metal component, and can remarkably improve the operating process of diesel oil hydro-conversion system and the reaction effect of the hydrocracking catalyst in the initial stage of operation, while obviously improve the yield of gasoline product, total liquid yield, and octane number of gasoline product.

The present invention further provides a method for preparing a hydrocracking catalyst, comprising the following steps: (1) controlling a support to contact with a carbon source and have carbon deposition reaction, to obtain a carbonized support; (2) roasting the carbonized support in an oxygen-containing gas, to obtain a decarbonized support, wherein, the carbon content in the decarbonized support is 20 to 80% of the carbon content in the carbonized support; the oxygen content in the oxygen-containing gas is 0.5 to 8 vol %, the roasting temperature is 250° C. to 390° C., and the roasting time is 3.5 to 20 h; (3) introducing a precursor of active metal component into the decarbonized support, and drying the decarbonized support; and (4) treating the product obtained in the step (3) through a heat treatment process, in which the precursor of active metal component is converted into active metal oxides, and the carbon in the decarbonized support is kept; wherein, the hydrocracking catalyst contain 1 to 5 wt % carbon calculated in C element, and the support and the precursor of active metal component are dosed in a way that the hydrocracking catalyst contains 60 to 90 wt % support and 15 to 40 wt % active metal component calculated in metal oxides.

Preferably, the carbon content in the decarbonized support is 30 to 70% of the carbon content in the carbonized support.

In a preferred embodiment of the present invention, based on the total weight of the hydrocracking catalyst, the content of the support is 60 to 90 wt %, the content of the active metal component calculated in metal oxides is 15 to 40 wt %, and the content of carbon calculated in C element is 1 to 3 wt %.

In another preferred embodiment of the present invention, based on the total weight of the catalyst, the content of the support is 60 to 85 wt %, the content of the active metal component calculated in metal oxides is 15 to 40 wt %, and the content of carbon calculated in C element is 1 to 3 wt %.

In the present invention, the sum of the contents of the components in the catalyst is 100%.

According to the present invention, preferably, the support is a silica-alumina support that contains a modified Y-type molecular sieve, and, based on the total weight of the support, the support contains 20 to 85 wt % modified Y-type molecular sieve and 15 to 80 wt % amorphous silica-alumina and/or alumina. Preferably, the support contains 30 to 70 wt % modified Y-type molecular sieve and 30 to 70 wt % amorphous silica-alumina and/or alumina.

According to the present invention, there is no particular restriction on the modified Y-type molecular sieve. Preferably, the modified Y-type molecular sieve is selected from a Y-type molecular sieve obtained through dealumination and silicon reinsertion and/or hydrothermal treatment of ammonium fluosilicate, and the molar ratio of $SiO_2/Al_2O_3$ in the modified Y-type molecular sieve is (5 to 15):1. The modified Y-type molecular sieve may be a commercial product or prepared with a conventional method.

In the present invention, the method for preparing the modified Y-type molecular sieve by dealumination and silicon reinsertion of ammonium fluosilicate usually includes the following steps:
(I) 1,000 g NaY molecular sieve powder (the molar ratio of $SiO_2/Al_2O_3$ is (3 to 6):1, the Na content calculated in $Na_2O$ is 8 to 15 wt %) is mixed with 0.4 to 0.8 mol/L ammonium nitrate at liquid-solid mass ratio of (1 to 5):1 and exchanges for 3 to 5 h at 80° C. to 100° C.; the process is repeated for 3 times, so that the Na content calculated in $Na_2O$ in the Y-type molecular sieve after the exchange is 2.0 to 3.0 wt %;
(II) The Y-type molecular sieve obtained in the step (I) is mixed with distilled water at liquid-solid mass ratio of (5 to 8):1, 300 ml 0.8 to 1.2 mol/L ammonium fluosilicate solution is added into the mixture, and then the mixture is treated for 2 to 4 h at 80° C. to 100° C.;
(III) The molecular sieve obtained in the step (II) is loaded into a hydrothermal treatment furnace, and treated by hydrothermal treatment for 1 to 3 h at water vapor pressure of 0.1 to 1 MPa and temperature of 520 to 560° C.; thus, a modified Y-type molecular sieve is obtained.

In the present invention, the hydrothermal treatment method for preparing the modified Y-type molecular sieve usually includes the following steps:
(i) 1,000 g NaY molecular sieve powder (the molar ratio of $SiO_2/Al_2O_3$ is (3 to 6):1, the Na content calculated in $Na_2O$ is 8 to 15 wt %) is mixed with 0.4 to 0.8 mol/L ammonium nitrate at liquid-solid mass ratio of (1 to 5):1 and exchanges for 3 to 5 h at 80° C. to 100° C.; the process is repeated for 3 times, so that the Na content calculated in $Na_2O$ in the Y-type molecular sieve after the exchange is 2.0 to 3.0 wt %;
(ii) The Y-type molecular sieve obtained in the step (i) is loaded into a hydrothermal treatment furnace, and treated by hydrothermal treatment for 1 to 3 h at water vapor pressure of 0.2 to 1 MPa and temperature of 600 to 640° C.; thus, a modified Y-type molecular sieve is obtained.

In the present invention, the amorphous silica-alumina and alumina may be commercial products or prepared with a conventional method.

According to the present invention, preferably, in the step (1), the support is obtained by mixing the modified Y-type molecular sieve with amorphous silica-alumina and/or alumina homogeneously, extruding the mixture into strips, and then drying and roasting the strips.

In the present invention, the strip extrusion process may be a matured forming process well known to those skilled in the art, and conventional auxiliary agents for forming, such as peptizing agent and extrusion aiding agent, can be added. The peptizing agent may be one or more of hydrochloric acid, nitric acid, sulfuric acid, acetic acid and oxalic acid. The extrusion-aiding agent refers to a substance helpful for extrusion forming, such as one or more of sesbania powder, soot carbon, graphite powder, and citric acid. In the extrusion forming process, based on the total amount of the modified Y-type molecular sieve and the amorphous silica-alumina and/or alumina, the amount of the extrusion aiding agent accounts for 1 to 10 wt % (calculated on dry basis). Furthermore, the drying conditions are: drying for 1 to 5 h at 80° C. to 120° C.; the roasting conditions are: roasting for 1 to 5 h at 400° C. to 700° C.

According to the present invention, in the step (1), the surface of the support is covered by the carbon source, and then carbon is coated on the surface of the support through the carbon deposition reaction. Preferably, the carbon source is selected from a gaseous or liquidus carbonaceous material, which may be a liquid or gaseous unsaturated olefins, such as $C_2$ to $C_{10}$ normal olefins or isomeric olefins, and dienes. To improve the carbon deposition efficiency, the carbon source may be selected from at least one of petroleum ether, benzene, methyl benzene, dimethyl benzene, catalytic gasoline, coker gasoline, butadiene, pentylene, hexadiene, butylene, pentene, heptylene, and nonylene.

According to the present invention, preferably, in the step (1), the conditions under which the support contacts with the carbon source include: pressure of 0.1 to 1 MPa and time of 0.1 to 6 h. The pressure is 0.1 to 1 MPa, and the time is 0.1 to 2 h if the carbon source is in gas state; the pressure is 0.1 to 1 MPa, and the time is 0.5 to 6 h if the carbon source is in liquid state. In the step (1), the support contacts with the carbon source fully, usually at normal temperature, i.e., 25° C. to 40° C.

According to the present invention, through the carbon deposition reaction, the carbon source is converted to carbon on the surface of the support. Preferably, the carbon deposition reaction happens in an oxygen-containing atmosphere, and the temperature of the carbon deposition reaction is 100° C. to 500° C., preferably is 180° C. to 300° C.; the time of the carbon deposition reaction is 20 to 200 h, preferably is 50 to 100 h.

According to the present invention, in the carbon deposition reaction, preferably the oxygen content in the oxygen-containing atmosphere is 10 to 100 vol %, and the oxygen-containing atmosphere is selected from a mixture of air or oxygen and an inert gas, and preferably is air. The inert gas may be a mixture of one or more of $CO_2$, $N_2$, He, Ne, and Ar.

In the present invention, the carbon content in the carbonized support obtained in the step (1) may be measured with an elemental analysis method, for example.

According to the present invention, the step (2) is used to decarbonize the carbonized support appropriately, so that the carbonized support can have rational acidity distribution. In the roasting process in the step (2), preferably the oxygen content in the oxygen-containing gas is 2 to 5 vol %; the oxygen-containing gas is a mixture of oxygen and at least one of $CO_2$, $N_2$, He, Ne and Ar.

In the step (2) of the method for preparing a hydrocracking catalyst provided in the present invention, preferably the roasting temperature is 300° C. to 390° C.; the roasting time is 4 to 20 h.

According to the present invention, in the step (2), the carbonized support decarbonized preferably through the following roasting process: in the step (2), the carbonized support is loaded into a roasting furnace, heated up from room temperature at 20 to 40° C./h heating rate to the roasting temperature, and kept at the roasting temperature till the roasting time is reached; the volume ratio of the oxygen-containing gas to the carbonized support is (500 to 5,000):1.

In the present invention, the roasting atmosphere, heating rate, final heating temperature, and roasting time are controlled to achieve appropriate decarburization; specifically, the carbonized support is placed in an atmosphere with low oxygen content in a roasting furnace, heated up from room temperature at a specific heating rate to a roasting temperature that is lower than the ordinary high temperature roasting temperature, and is held for a long roasting time, i.e., the carbonized support is roasted slowly at a low roasting temperature for a long time. In the present invention, the room temperature is 25° C. to 40° C.

In contrast, in the prior art, decarburization is usually carried out by roasting at a high temperature for a short time in an atmosphere with high oxygen content (e.g., air), the roasting temperature (usually 500° C. to 600° C.) is much higher than the roasting temperature in the present invention, and the roasting time is 1 h or shorter. In the prior art, to accomplish rapid roasting for decarburization, usually the carbonized support is directly loaded into a roasting furnace pre-heated to the roasting temperature, i.e., there is no operation of loading the carbonized support into the roasting furnace and heating up the carbonized support from room temperature at a specific heating rate to the roasting temperature as described in the step (2) in the present invention.

In the present invention, the carbon content in the obtained decarbonized support may be measured with an elemental analysis method, for example. The quantitative relation between the carbon content in the decarbonized support and the carbon content in the carbonized support can be ascertained further, and the rate of decarburization through the roasting process in the step (2) can be calculated with the following formula:

Rate of decarburization=[1−(carbon content in decarbonized support/carbon content in carbonized support)]×100%.

According to the present invention, the step (3) is used to load the active metal component to the decarbonized support. A deposition or impregnation approach may be used. Preferably, saturated impregnation may be used, with a water solution of a precursor of active metal component, for example. Preferably, in the step (3), the method for introducing the precursor of active metal component is to impregnate the decarbonized support in an impregnation liquid that contains the precursor of active metal component.

In the present invention, preferably the precursor of active metal component is a compound that contains metal elements selected from VIII metal elements and/or VIB metal elements, wherein, the VIII metal element preferably is Ni and/or Co; the VIB metal element preferably is W and/or Mo. The precursor of active metal component is preferably selected from nitrates, basic carbonates, citrates, or oxides of Ni and/or Co; and oxides of W and/or Mo or W-containing compounds or Mo-containing compounds; more preferably, the precursor of active metal component is selected from at least one of nickel nitrate, basic nickel carbonate, nickel citrate, cobalt citrate, cobalt nitrate, molybdenum oxide, ammonium molybdate, and ammonium metatungstate.

Preferably, the liquid-solid mass ratio of the impregnation liquid to the decarbonized support is (1.5 to 3):1.

Preferably, in the impregnation liquid, the content of the precursor of active metal component selected from VIB metal elements is 20 to 60 g/100 ml calculated in metal oxides, and the content of the precursor of active metal component selected from VIII metal elements is 3 to 20 g/100 ml calculated in metal oxides.

In the present invention, the content of the precursor of active metal component in the impregnation liquid may be adjusted appropriately according to the requirement for the product.

According to the present invention, in the step (3), preferably the drying is carried out for 2 to 8 h at 90° C. to 150° C.

According to the present invention, the step (4) may be accomplished a variety of ways, as long as the purpose of converting the precursor of active metal component into active metal oxides while keeping the carbon in the decarbonized support. In a preferred embodiment, the heat treatment comprises: roasting the product obtained in the step (3) in an inert gas for 2 to 10 h at 400° C. to 700° C., to obtain a hydrocracking catalyst. Specifically, the process may be: the roasting is carried out in a roasting furnace by: first, introducing an inert gas into the roasting furnace for displacement, wherein, the volume ratio of gas/agent for controlling the introduction speed of the inert gas (inert gas: impregnated and dried decarbonized support) is (500 to 5,000):1; then, heating up the roasting furnace at 20° C./h to 40° C./h heating rate to the roasting temperature when the oxygen purity in the atmosphere in the roasting furnace is lower than 0.1 vol % after the inert gas is displaced into the atmosphere in the roasting furnace; and accomplishing the roasting within the roasting time at the roasting temperature. The inert gas used in the roasting process may be a mixture of one or more of $CO_2$, $N_2$, He, Ne, and Ar.

In another preferred embodiment, the product obtained in the step (3) is activated at 150° C. to 300° C. in an oxygen-containing atmosphere for 1 to 5 h, to obtain the hydrocracking catalyst.

The present invention further provides a hydrocracking catalyst prepared with the method according to the present invention.

The present invention further provides a use of the hydrocracking catalyst according to the present invention in diesel oil hydrocracking reaction.

The present invention further provides a method for hydrocracking catalytic diesel oil, comprising: (a) pre-treating catalytic diesel oil by hydrocracking; and (b) treating the product obtained in the step (a) by hydrocracking in the presence of the hydrocracking catalyst according to the present invention and hydrogen.

According to the present invention, in the step (a), the catalytic diesel oil may contact with a hydro-pretreating agent. The conditions of the hydrocracking pretreatment may include: reaction pressure of 6 to 20 MPa, reaction temperature of 330° C. to 400° C., volumetric space velocity of material feeding of 0.1 to 2 $h^{-1}$, and volume ratio of hydrogen to oil of (500 to 2,000):1. Preferably, the hydrocracking pretreatment in the step (a) is made under conditions that ensure the nitrogen content in the obtained product is 1 to 100 ppm, wherein, the nitrogen content is in unit of ppm (weight).

According to the present invention, in the step (b), the oil product obtained in the step (a) may be hydrocracked. Preferably, the conditions of the hydrocracking in the step (b) include: reaction pressure of 6 to 20 MPa, reaction temperature of 350° C. to 420° C., volumetric space velocity of material feeding of 0.1 to 2 $h^{-1}$, and volume ratio of hydrogen to oil of (500 to 2,000):1, wherein, the volume ratio of hydrogen to oil is the volume ratio of hydrogen to the oil product obtained in the step (a), which may be the volume ratio at 25° C.

In the present inventions, all pressure values are gauge pressure values.

Hereunder the present invention will be detailed in embodiments. However, the present invention is not limited to those embodiments.

In the following examples and comparative examples, the infrared acid amount in the catalyst is measured by pyridine adsorption infrared spectrometry with a Nicolet 6700 FTIR spectrometer from NICOLET (a US company).

The process is as follows:

20 mg ground sample (in particle size smaller than 200 mpi) is pressed into a thin flake in 20 mm diameter, and loaded onto a sample holder of an absorption cell, 200 mg sample (in flake shape) is loaded into a cup hung to the lower end of a quartz spring (the spring length $x_1$ (mm) is logged before the sample is loaded), the absorption cell is connected to an adsorption tube, vacuumed to $4 \times 10^{-2}$ Pa vacuum level, heated up to 500° C. and kept at the temperature for 1 h, to remove the adsorbed substance on the surface of the sample (the spring length $x_2$ (mm) after the sample is purified is logged); then, the sample is cooled down to room temperature, absorbs pyridine to saturated state, and heated up to 160° C. and held at the temperature for 1 h, to desorb the pyridine absorbed physically (the spring length $x_3$ (mm) after the sample absorbs pyridine is logged); the total acid amount is calculated with a pyridine gravimetric adsorption method; in the same way, the sample is heated up to 350° C. and held for 1 h, to desorb the pyridine absorbed physically (the spring length $x_4$ (mm) after the sample absorbs pyridine is logged); the amount of strong acid with Desorption temperature greater than 350° C. is calculated with a pyridine gravimetric adsorption method.

Wherein, the total acid amount is calculated with a pyridine gravimetric adsorption method as follows:

According to Hooke's law (the relation between spring elongation and stress): $f = k\Delta x$ When the spring is placed vertically: $m = k\Delta x$ Where, m is the mass of the sample, g; $\Delta x$ is the elongation of the spring, mm; k is the stiffness coefficient of the spring.

$$\frac{\text{Mass\_of\_Absorbed\_Pyrindine}/79.1}{\text{Total\_Acid}} = \frac{\text{Mass\_of\_Sample}}{1\,g}$$

Total acid amount C (unit: mmol/g):

$$C = \frac{k(x_3 - x_2)}{k(x_2 - x_1) \times 79.1} \text{mol/g} = \frac{x_3 - x_2}{x_2 - x_1} \times \frac{1}{79.1} \text{mol/g} = 12.64 \times \frac{x_3 - x_2}{x_2 - x_1} \text{mmol/g}$$

Note: 79.1 is the mole mass of pyridine, in unit of g/mol.

The carbon content is measured with an elementary analysis method with a HORIBA EMIA-820V infrared carbon-sulfur analyzer, utilizing a principle of combustion in oxygen flow and infrared absorption measurement. Specifically, the sample is heated in oxygen flow to have an oxidizing reaction, so that the majority of carbon (C) is turned into carbon dioxide ($CO_2$), a small part of carbon is turned into carbon monoxide (CO), and the sulfur (S) is turned into sulfur dioxide ($SO_2$). In that process, the moisture in the sample is gasified, the hydrogen (H) in the sample is oxidized into water; therefore, there is some moisture in the gas flow. The moisture may be removed by means of magnesium perchlorate $Mg(ClO_4)_2$. The oxygen flow is adjusted to a constant flow rate and then introduced into an infrared detector, to detect the quantities of $CO_2$, CO, and $SO_2$, and then the carbon concentration and sulfur concentration in the sample are calculated.

The specific surface area and pore volume of the catalyst are measured with a low-temperature nitrogen adsorption BET method. The specific surface area, pore volume and pore distribution of the sample are read directly on an ASAP 2400 specific surface area tester from Micromeritics (a US company). All samples are desorbed for 12 h at 473K before the test. Nitrogen is used as a adsorption gas, and the adsorption is measured at 77K temperature, the specific surface area is calculated with the Brunauer-Emmett-Teller (BET) equation, the total pore volume is the volume corresponding to the adsorption quantity when the relative pressure is 1, the pore volume and pore distribution are obtained from a BJH adsorption curve or desorption curve, the micro-pore system and pore distribution are obtained by calculation with a Horvath-Kawazon (HK) adsorption curve.

The catalyst composition and content are determined through materials input calculation;

The atomic ratio of the active metal component to Al on the catalyst surface is measured by X-ray photoelectron spectroscopy. Specifically, the test is carried out on a Multilab 2000 X-ray photoelectron spectrometer from Thermo-Fisher (a US company), the energy scanning range of which is 0 to 5000 eV; the throughput can be adjusted continuously within 1 to 400 eV range, with adjusting step size ≤1 eV.

The NaY molecular sieve powder and macro-pore alumina used in the following preparation examples, examples, and comparative examples are from SINOPEC Fushun Catalyst Branch, and the ammonium nitrate and ammonium fluosilicate are from Tianjin Yongda Chemical Reagent Co., Ltd. and Shanghai Third Reagent Plant respectively.

Preparation Example 1

This preparation example is provided here to describe the preparation of the modified molecular sieve.
(1) 1,000 g NaY molecular sieve powder is mixed with 0.6 mol/L ammonium nitrate at liquid-solid mass ratio of 3:1, and exchanges for 3 h at 80° C.; the process is repeated for 3 times, so that the Na content in the Y-type molecular sieve after the exchange is 2.0 wt % calculated in $Na_2O$;
(2) The Y-type molecular sieve obtained in the step (1) is mixed with distilled water at liquid-solid mass ratio of 5:1, 300 ml 1.0 mol/L ammonium fluosilicate solution is added into the mixture, and then the mixture is treated for 2 h at 80° C.;
(3) the molecular sieve obtained in the step (2) is treated by hydrothermal treatment in a hydrothermal treatment furnace at water vapor pressure of 0.1 MPa and 540° C. for 2 h, so as to obtain a modified Y-type molecular sieve 1, denoted as MY-1, in which the molar ratio of $SiO_2/Al_2O_3$ is 11.0:1.

Preparation Example 2

This preparation example is provided here to describe the preparation of the modified molecular sieve.
(1) 1,000 g NaY molecular sieve powder is mixed with 0.6 mol/L ammonium nitrate at liquid-solid mass ratio of 3:1, and exchanges for 3 h at 80° C.; the process is repeated for 3 times, so that the Na content in the Y-type molecular sieve after the exchange is 2.0 wt % calculated in $Na_2O$;
(2) the molecular sieve obtained in the step (1) is treated by hydrothermal treatment in a hydrothermal treatment furnace at water vapor pressure of 0.2 MPa and 620° C. for 2 h, so as to obtain a modified Y-type molecular sieve 2, denoted as MY-2, in which the molar ratio of $SiO_2/Al_2O_3$ is 5.4:1.

Example 1

(1) 55 g modified Y-type molecular sieve (MY-1) is mixed with 45 g macro-pore alumina, 50 ml dilute nitric acid at 4 g/100 ml concentration is added into the mixture, and then the mixture is mixed and pressed in a mixer to a state that is suitable for extrusion; next, the mixture is extruded in an extruder into strips, and the strips is dried for 4 h at 100° C., and then roasted for 3 h at 550° C., to obtain a support;
(2) The support obtained in the step (1) is loaded into an enclosed container filled with butadiene gas, the support contacts with butadiene for 20 min. at pressure of 0.3 MPa and temperature of 25° C.; then, the support is heated up in an air atmosphere to 200° C. temperature and held at the temperature for 60 h for carbon deposition reaction, so as to obtain a carbonized support, in which the measured carbon content is 7.5 wt %;
(3) The carbonized support obtained in the step (2) is loaded into a roasting furnace, an oxygen/nitrogen mixed gas with 1 vol % oxygen content is charged into the roasting furnace, the roasting furnace is heated up at 25° C./h heating rate to 350° C., and the carbonized support is roasted for 4 h at the temperature, so as to obtain a decarbonized support, in which the measured carbon content is 2.8 wt %;
(4) 1,000 ml Mo—Ni impregnation liquid is prepared, in which the contents of active metal components calculated in $MoO_3$ and NiO are 32 g/100 ml and 10 g/100 ml respectively;
(5) The decarbonized support is impregnated in the Mo—Ni impregnation liquid at liquid-solid mass ratio of 3:1, and the impregnated product is dried for 4 h at 120° C.;
(6) The dried sample obtained in the step (5) is loaded into a roasting furnace, and $N_2$ gas is charged into the roasting furnace for displacement, while the volume ratio of gas/agent is controlled at 2,000:1;
(7) When the oxygen purity reaches 0.08 vol % in the $N_2$ displacement process, the roasting furnace is heated up at 40° C./h to 550° C., and held at the temperature for 6 h, so as to obtain a hydrocracking catalyst, which is numbered as C-1.

Example 2

(1) 60 g modified Y-type molecular sieve (MY-1) is mixed with 40 g macro-pore alumina, 40 ml dilute nitric acid at 6 g/100 ml concentration is added into the mixture, and then the mixture is mixed and pressed in a mixer to a state that is suitable for extrusion; next, the mixture is extruded in an extruder into strips, and the strips is dried for 6 h at 80° C., and then roasted for 5 h at 400° C., to obtain a support;
(2) The support obtained in the step (1) is immersed in heptylene at 30° C. for 4 h, and then the support is heated up in an air atmosphere to 180° C. and held at the temperature for 150 h for carbon deposition reaction, so as to obtain a carbonized support, in which the measured carbon content is 10.2 wt %;
(3) The carbonized support obtained in the step (2) is loaded into a roasting furnace, an oxygen/nitrogen mixed gas with 3 vol % oxygen content is charged into the roasting furnace, the roasting furnace is heated up at 40° C./h heating rate to 360° C., and the carbonized support is roasted for 10 h at the temperature, so as to obtain a decarbonized support, in which the measured carbon content is 2.5 wt %;
(4) 1,000 ml Mo—Ni impregnation liquid is prepared, in which the contents of active metal components calculated in $MoO_3$ and NiO are 32 g/100 ml and 10 g/100 ml respectively;
(5) The decarbonized support is impregnated in the Mo—Ni impregnation liquid at liquid-solid mass ratio of 5:1, and the impregnated product is dried for 3 h at 150° C.;
(6) The dried sample obtained in the step (5) is loaded into a roasting furnace, and He gas is charged into the roasting furnace for displacement, while the volume ratio of gas/agent is controlled at 1,000:1;
(7) When the oxygen purity reaches 0.05 vol % in the $N_2$ displacement process, the roasting furnace is heated up at 25° C./h to 600° C., and held at the temperature for 4 h, so as to obtain a hydrocracking catalyst, which is numbered as C-2.

Example 3

(1) 45 g modified Y-type molecular sieve (MY-1) is mixed with 55 g macro-pore alumina, 60 ml dilute nitric acid at 4 g/100 ml concentration is added into the mixture, and then the mixture is mixed and pressed in a mixer to a state that is suitable for extrusion; next, the mixture is extruded in an extruder into strips, and the strips is dried for 1 h at 120° C., and then roasted for 1 h at 700° C., to obtain a support;
(2) The support obtained in the step (1) is immersed in heptylene at 40° C. for 4 h, and then the support is heated up in an air atmosphere to 280° C. and held at the temperature for 80 h for carbon deposition reaction, so as to obtain a carbonized support, in which the measured carbon content is 11.2 wt %;
(3) The carbonized support obtained in the step (2) is loaded into a roasting furnace, an oxygen/nitrogen mixed gas with 3 vol % oxygen content is charged into the roasting furnace, the roasting furnace is heated up at 25° C./h heating rate to 330° C., and the carbonized support is roasted for 15 h at the temperature, so as to obtain a decarbonized support, in which the measured carbon content is 5.0 wt %;
(4) 1,000 ml Mo—Ni impregnation liquid is prepared, in which the contents of active metal components calculated in $MoO_3$ and NiO are 40 g/100 ml and 12 g/100 ml respectively;
(5) The decarbonized support is impregnated in the Mo—Ni impregnation liquid at liquid-solid mass ratio of 4:1, and the impregnated product is dried for 3 h at 150° C.;
(6) The dried sample obtained in the step (5) is loaded into a roasting furnace, and $CO_2$ gas is charged into the roasting furnace for displacement, while the volume ratio of gas/agent is controlled at 3,000:1;
(7) When the oxygen purity reaches 0.05 vol % in the $N_2$ displacement process, the roasting furnace is heated up at 40° C./h to 650° C., and held at the temperature for 4 h, so as to obtain a hydrocracking catalyst, which is numbered as C-3.

Example 4

(1) 55 g modified Y-type molecular sieve (MY-2) is mixed with 45 g macro-pore alumina, 50 ml dilute nitric acid at 4 g/100 ml concentration is added into the mixture, and then the mixture is mixed and pressed in a mixer to a state that is suitable for extrusion; next, the mixture is extruded in an extruder into strips, and the strips is dried for 4 h at 100° C., and then roasted for 3 h at 550° C., to obtain a support;
(2) The support obtained in the step (1) is loaded into an enclosed container filled with butadiene gas, the support contacts with butadiene for 20 min. at pressure of 0.3 MPa and temperature of 25° C.; then, the support is heated up in an air atmosphere to 200° C. temperature and held at the temperature for 60 h for carbon deposition reaction, so as to obtain a carbonized support, in which the measured carbon content is 7.5 wt %;
(3) The carbonized support obtained in the step (2) is loaded into a roasting furnace, an oxygen/nitrogen mixed gas with 1 vol % oxygen content is charged into the roasting furnace, the roasting furnace is heated up at 25° C./h heating rate to 350° C., and the carbonized support is roasted for 4 h at the temperature, so as to obtain a decarbonized support, in which the measured carbon content is 2.8 wt %;
(4) 1,000 ml W—Ni impregnation liquid is prepared, in which the contents of active metal components calculated in $WO_3$ and NiO are 32 g/100 ml and 10 g/100 ml respectively;
(5) The decarbonized support is impregnated in the W—Ni impregnation liquid at liquid-solid mass ratio of 3:1, and the impregnated product is dried for 4 h at 120° C.;
(6) The dried sample obtained in the step (5) is loaded into a roasting furnace, and $N_2$ gas is charged into the roasting furnace for displacement, while the volume ratio of gas/agent is controlled at 2,000:1;
(7) When the oxygen purity reaches 0.08 vol % in the $N_2$ displacement process, the roasting furnace is heated up at 40° C./h to 550° C., and held at the temperature for 6 h, so as to obtain a hydrocracking catalyst, which is numbered as C-4.

Example 5

(1) 55 g modified Y-type molecular sieve (MY-1) is mixed with 45 g macro-pore alumina, dilute nitric acid at 4 g/100 ml concentration is added into the mixture, and then the mixture is mixed and pressed in a mixer to a state that is suitable for extrusion; next, the mixture is extruded in an extruder into strips, and the strips is dried for 4 h at 100° C., and then roasted for 3 h at 550° C., to obtain a support;
(2) The support obtained in the step (1) is loaded into an enclosed container filled with butadiene gas, the support contacts with butadiene for 20 min. at pressure of 0.3 MPa and temperature of 25° C.; then, the support is heated up in an air atmosphere to 200° C. temperature and held at the temperature for 60 h for carbon deposition reaction, so as to obtain a carbonized support, in which the measured carbon content is 7.5 wt %;
(3) The carbonized support obtained in the step (2) is loaded into a roasting furnace, an oxygen/nitrogen mixed gas with 1 vol % oxygen content is charged into the roasting furnace, the roasting furnace is heated up at 25° C./h heating rate to 350° C., and the carbonized support is roasted for 4 h at the temperature, so as to obtain a decarbonized support, in which the measured carbon content is 2.8 wt %;
(4) 1,000 ml Mo—Ni impregnation liquid is prepared, in which the contents of active metal components calculated in $MoO_3$ and NiO are 32 g/100 ml and 10 g/100 ml respectively;
(5) The decarbonized support is impregnated in the Mo—Ni impregnation liquid at liquid-solid mass ratio of 3:1, and the impregnated product is dried for 4 h at 120° C.;
(6) The dried sample obtained in the step (5) is loaded into a roasting furnace, and roasted for 3 h at 250° C. in an air atmosphere for activation, so as to obtain a hydrocracking catalyst, which is numbered as C-5.

Example 6

(1) 60 g modified Y-type molecular sieve (MY-2) is mixed with 40 g macro-pore alumina, 40 ml dilute nitric acid at 6 g/100 ml concentration is added into the mixture, and then the mixture is mixed and pressed in a mixer to a state that is suitable for extrusion; next, the mixture is extruded in an extruder into strips, and the strips is dried for 6 h at 80° C., and then roasted for 5 h at 400° C., to obtain a support;
(2) The support obtained in the step (1) is immersed in heptylene at 30° C. for 4 h, and then the support is heated up in an air atmosphere to 180° C. and held at the temperature for 150 h for carbon deposition reaction, so as to obtain a carbonized support, in which the measured carbon content is 10.2 wt %;
(3) The carbonized support obtained in the step (2) is loaded into a roasting furnace, an oxygen/nitrogen mixed gas with 3 vol % oxygen content is charged into the roasting furnace, the roasting furnace is heated up at 40° C./h heating rate to 360° C., and the carbonized support is roasted for 10 h at the temperature, so as to obtain a decarbonized support, in which the measured carbon content is 2.5 wt %;
(4) 1,000 ml Mo—Ni impregnation liquid is prepared, in which the contents of active metal components calculated in $MoO_3$ and NiO are 32 g/100 ml and 10 g/100 ml respectively;
(5) The decarbonized support is impregnated in the Mo—Ni impregnation liquid at liquid-solid mass ratio of 5:1, and the impregnated product is dried for 3 h at 150° C.;
(6) The dried sample obtained in the step (5) is loaded into a roasting furnace, and roasted for 2 h at 150° C. in an air atmosphere for activation, so as to obtain a hydrocracking catalyst, which is numbered as C-6.

Example 7

(1) 45 g modified Y-type molecular sieve (MY-1) is mixed with 55 g macro-pore alumina, 60 ml dilute nitric acid at 4 g/100 ml concentration is added into the mixture, and then the mixture is mixed and pressed in a mixer to a state that is suitable for extrusion; next, the mixture is extruded in an extruder into strips, and the strips is dried for 1 h at 120° C., and then roasted for 1 h at 700° C., to obtain a support;
(2) The support obtained in the step (1) is immersed in heptylene at 40° C. for 4 h, and then the support is heated up in an air atmosphere to 280° C. and held at the temperature for 80 h for carbon deposition reaction, so as to obtain a carbonized support, in which the measured carbon content is 11.2 wt %;
(3) The carbonized support obtained in the step (2) is loaded into a roasting furnace, an oxygen/nitrogen mixed gas with 3 vol % oxygen content is charged into the roasting furnace, the roasting furnace is heated up at 25° C./h heating rate to 330° C., and the carbonized support is roasted for 15 h at the temperature, so as to obtain a decarbonized support, in which the measured carbon content is 5.0 wt %;
(4) 1,000 ml Mo—Ni impregnation liquid is prepared, in which the contents of active metal components calculated in $MoO_3$ and NiO are 40 g/100 ml and 12 g/100 ml respectively;
(5) The decarbonized support is impregnated in the Mo—Ni impregnation liquid at liquid-solid mass ratio of 4:1, and the impregnated product is dried for 3 h at 150° C.;
(6) The dried sample obtained in the step (5) is loaded into a roasting furnace, and roasted for 1 h at 250° C. in an air atmosphere for activation, so as to obtain a hydrocracking catalyst, which is numbered as C-7.

Comparative Example 1

(1) 55 g modified Y-type molecular sieve (MY-1) is mixed with 45 g macro-pore alumina, 50 ml dilute nitric acid at 4 g/100 ml concentration is added into the mixture, and then the mixture is mixed and pressed in a mixer to a state that is suitable for extrusion; next, the mixture is extruded in an extruder into strips, and the strips is dried for 4 h at 100° C., and then roasted for 3 h at 550° C., to obtain a support;
(2) 1,000 ml Mo—Ni impregnation liquid is prepared, in which the contents of active metal components calculated in $MoO_3$ and NiO are 24 g/100 ml and 8 g/100 ml respectively;
(3) The support is impregnated in the Mo—Ni impregnation liquid at liquid-solid mass ratio of 3:1, and the impregnated product is dried for 4 h at 120° C.; then, the support is roasted for 3 h at 500° C. in an air atmosphere, so as to obtain a hydrocracking catalyst, which is numbered as B-1.

Comparative Example 2

(1) 55 g modified Y-type molecular sieve (MY-1) is mixed with 45 g macro-pore alumina, 50 ml dilute nitric acid at 4 g/100 ml concentration is added into the mixture, and then the mixture is mixed and pressed in a mixer to a state that is suitable for extrusion; next, the mixture is extruded in an extruder into strips, and the strips is dried for 4 h at 100° C., and then roasted for 3 h at 550° C., to obtain a support;
(2) The support obtained in the step (1) is loaded into an enclosed container filled with butadiene gas, the support contacts with butadiene for 20 min. at pressure of 0.3 MPa and temperature of 25° C.; then, the support is heated up in an air atmosphere to 200° C. temperature and held at the temperature for 60 h for carbon deposition reaction, so as to obtain a carbonized support, in which the measured carbon content is 7.5 wt %;
(3) 1,000 ml Mo—Ni impregnation liquid is prepared, in which the contents of active metal components calculated in $MoO_3$ and NiO are 42 g/100 ml and 12 g/100 ml respectively;
(4) The carbonized support is impregnated in the Mo—Ni impregnation liquid at liquid-solid mass ratio of 3:1, and the impregnated product is dried for 4 h at 120° C.; then, the support is treated for 4 h at 550° C. in an nitrogen atmosphere, so as to obtain a hydrocracking catalyst, which is numbered as B-2.

Comparative Example 3

(1) 55 g modified Y-type molecular sieve (MY-1) is mixed with 45 g macro-pore alumina, 50 ml dilute nitric acid at 4 g/100 ml concentration is added into the mixture, and then the mixture is mixed and pressed in a mixer to a state that is suitable for extrusion; next, the mixture is extruded in an extruder into strips, and the strips is dried for 4 h at 100° C., and then roasted for 3 h at 550° C., to obtain a support;
(2) The support obtained in the step (1) is loaded into an enclosed container filled with butadiene gas, the support contacts with butadiene for 20 min. at pressure of 0.3 MPa and temperature of 25° C.; then, the support is heated up in an air atmosphere to 200° C. temperature and held at the temperature for 60 h for carbon deposition reaction, so as to obtain a carbonized support, in which the measured carbon content is 7.5 wt %;
(3) The carbonized support obtained in the step (2) is loaded into a roasting furnace, air is charged into the roasting furnace, the roasting furnace is heated up at 25° C./h heating rate to 500° C., and the carbonized support is roasted for 4 h at the temperature, so as to obtain a decarbonized support, in which the measured carbon content is 0.3 wt %;

(4) 1,000 ml Mo—Ni impregnation liquid is prepared, in which the contents of active metal components calculated in $MoO_3$ and NiO are 28 g/100 ml and 9 g/100 ml respectively;

(5) The decarbonized support is impregnated in the Mo—Ni impregnation liquid at liquid-solid mass ratio of 3:1, and the impregnated product is dried for 4 h at 120° C.;

(6) The dried sample obtained in the step (5) is loaded into a roasting furnace, and $N_2$ gas is charged into the roasting furnace for displacement, while the volume ratio of gas/agent is controlled at 2,000:1;

(7) When the oxygen purity reaches 0.08 vol % in the $N_2$ displacement process, the roasting furnace is heated up at 40° C./h to 550° C., and held at the temperature for 6 h, so as to obtain a hydrocracking catalyst, which is numbered as B-3.

Comparative Example 4

(1) 55 g modified Y-type molecular sieve (MY-1) is mixed with 45 g macro-pore alumina, 50 ml dilute nitric acid at 4 g/100 ml concentration is added into the mixture, and then the mixture is mixed and pressed in a mixer to a state that is suitable for extrusion; next, the mixture is extruded in an extruder into strips, and the strips is dried for 4 h at 100° C., and then roasted for 3 h at 550° C., to obtain a support;

(2) 1,000 ml Mo—Ni impregnation liquid 1 is prepared, in which the contents of active metal components calculated in $MoO_3$ and NiO are 16 g/100 ml and 6 g/100 ml respectively; then, the support obtained in the step (1) is impregnated in the Mo—Ni impregnation liquid 1 at liquid-solid mass ratio of 3:1, and then is dried for 4 h at 120° C., to obtain an intermediate product;

(3) The intermediate product obtained in the step (2) is loaded into an enclosed container filled with butadiene gas, and contacts with butadiene fully for 20 min. at pressure of 0.3 MPa and temperature of 25° C.; then, the support is heated up to 200° C. in an air atmosphere and held at the temperature for 60 h for carbon deposition reaction, so as to obtain a carbonized support, in which the measured carbon content is 7.5 wt %;

(4) The carbonized support prepared in the step (3) is directly loaded into a muffle furnace preheated to 550° C., and roasted for a short time (30 min.) in an air atmosphere (with high oxygen content), so as to burn off the carbon deposit on the surface layer of the carbonized support and obtain a decarbonized support;

(5) 1,000 ml Mo—Ni impregnation liquid 2 is prepared, in which the contents of active metal components calculated in $MoO_3$ and NiO are 25 g/100 ml and 8 g/100 ml respectively;

(6) The decarbonized support is impregnated in the Mo—Ni impregnation liquid 2 at liquid-solid mass ratio of 3:1, and the impregnated product is dried for 4 h at 120° C., to obtain a dried sample;

(7) The dried sample obtained in the step (6) is loaded into a roasting furnace, and $N_2$ gas is charged into the roasting furnace for displacement, while the volume ratio of gas/agent is controlled at 2,000:1;

(8) When the oxygen purity reaches 0.08 vol % in the $N_2$ displacement process, the roasting furnace is heated up at 40° C./h to 550° C., and held at the temperature for 6 h, so as to obtain a hydrocracking catalyst, which is numbered as B-4.

Comparative Example 5

(1) 55 g modified Y-type molecular sieve (MY-1) is mixed with 45 g macro-pore alumina, 50 ml dilute nitric acid at 4 g/100 ml concentration is added into the mixture, and then the mixture is mixed and pressed in a mixer to a state that is suitable for extrusion; next, the mixture is extruded in an extruder into strips, and the strips is dried for 4 h at 100° C., and then roasted for 3 h at 550° C., to obtain a support;

(2) The support obtained in the step (1) is loaded into an enclosed container filled with butadiene gas, the support contacts with butadiene for 20 min. at pressure of 0.3 MPa and temperature of 25° C.; then, the support is heated up in an air atmosphere to 200° C. temperature and held at the temperature for 60 h for carbon deposition reaction, so as to obtain a carbonized support, in which the measured carbon content is 7.5 wt %;

(3) The carbonized support obtained in the step (2) is loaded into a roasting furnace, an oxygen/nitrogen mixed gas with 1 vol % oxygen content is charged into the roasting furnace, the roasting furnace is heated up at 25° C./h heating rate to 350° C., and the carbonized support is roasted for 4 h at the temperature, so as to obtain a decarbonized support, in which the measured carbon content is 2.8 wt %;

(4) 1,000 ml Mo—Ni impregnation liquid is prepared, in which the contents of active metal components calculated in $MoO_3$ and NiO are 32 g/100 ml and 10 g/100 ml respectively;

(5) The support is impregnated in the Mo—Ni impregnation liquid at liquid-solid mass ratio of 3:1, and the impregnated product is dried for 4 h at 120° C.; then, the support is roasted for 3 h at 500° C. in an air atmosphere, so as to obtain a hydrocracking catalyst, which is numbered as B-5.

Testing Examples 1-12

To evaluate the hydrocracking performance of the hydrocracking catalysts prepared in the examples and comparative examples, evaluation tests of the catalysts C-1 to C-7, and B-1 to B-5 are carried out on a small tester.

The evaluation tester employs a single-stage and single-pass process with two reactors connected in series, wherein, the first reactor is charged with a hydrocracking pretreating catalyst FF-36 that is widely used in the art (from SINOPEC Fushun Research Institute of Petroleum and Petrochemicals) for hydrocracking Pretreatment of the raw oil; the second reactor is charged with a catalyst.

In the test cases 1-8, the second reactor is charged with the catalysts C-1, C-2, C-3, C-4, C-5, C-6, C-7, B-1, B-2, B-3, B-4, and B-5, respectively. The properties of the catalysts are shown in Table 1. The raw oil is catalytic diesel oil, of which the basic physical parameters are shown in Table 2. Table 3 shows the hydrocracking conditions. Table 4 shows the hydrocracking results after 300 h operation under the conditions shown in Table 3. Table 5 shows the long-time operation results of the hydrocracking catalysts C-1 and B-1.

TABLE 1

| Catalyst | C-1 | C-2 | C-3 | C-4 | C-5 | C-6 | C-7 |
|---|---|---|---|---|---|---|---|
| Content of active metal, wt % | | | | | | | |
| $MoO_3$ | 13.9 | 15.2 | 15.6 | — | 13.7 | 15.2 | 15.4 |
| $WO_3$ | — | — | — | 14.2 | — | — | — |
| NiO | 4.6 | 5.0 | 5.2 | 4.4 | 4.6 | 5.1 | 5.0 |
| Carbon content, wt % | 2.8 | 2.5 | 5.0 | 2.9 | 2.8 | 2.5 | 5.0 |
| Surface properties | | | | | | | |
| Pore volume, ml/g | 0.30 | 0.32 | 0.25 | 0.29 | 0.29 | 0.30 | 0.25 |
| Specific surface area, m²/g | 302 | 320 | 292 | 300 | 300 | 315 | 285 |
| Infrared acid amount, mmol/g | | | | | | | |
| Total acid amount | 0.55 | 0.58 | 0.44 | 0.54 | 0.54 | 0.58 | 0.43 |
| Content of strong acid with desorption temperature >350° C. | 0.026 | 0.029 | 0.018 | 0.027 | 0.027 | 0.028 | 0.018 |
| Ratio of total acid/strong acid | 20.3 | 20.0 | 24.4 | 20.0 | 20.0 | 20.7 | 23.8 |
| Atomic ratio of Mo/Al on surface | 0.52 | 0.55 | 0.56 | — | 0.46 | 0.46 | 0.47 |
| Atomic ratio of W/Al on surface | — | — | — | 0.50 | — | — | — |
| Atomic ratio of Ni/Al on surface | 0.33 | 0.34 | 0.38 | 0.33 | 0.28 | 0.29 | 0.29 |

| Catalyst | B-1 | B-2 | B-3 | B-4 | B-5 |
|---|---|---|---|---|---|
| Content of active metal, wt % | | | | | |
| $MoO_3$ | 14.2 | 13.4 | 14.2 | 14.3 | 14.0 |
| $WO_3$ | — | — | — | — | — |
| NiO | 4.7 | 4.3 | 4.4 | 4.3 | 4.6 |
| Carbon content, wt % | — | 7.5 | 0.3 | 5.9 | 0.1 |
| Surface properties | | | | | |
| Pore volume, ml/g | 0.35 | 0.13 | 0.35 | 0.22 | 0.35 |
| Specific surface area, m²/g | 350 | 100 | 340 | 280 | 345 |
| Infrared acid amount, mmol/g | | | | | |
| Total acid amount | 0.66 | 0.22 | 0.64 | 0.24 | 0.65 |
| Content of strong acid with desorption temperature >350° C. | 0.15 | 0.017 | 0.14 | 0.020 | 0.15 |
| Ratio of total acid/strong acid | 4.4 | 12.9 | 4.57 | 12.0 | 4.3 |
| Atomic ratio of Mo/Al on surface | 0.49 | 0.52 | 0.52 | 0.51 | 0.49 |
| Atomic ratio of Ni/Al on surface | 0.31 | 0.32 | 0.33 | 0.33 | 0.30 |

TABLE 2

| Raw oil | Catalytic diesel oil |
|---|---|
| Density, g/cm³ | 0.9204 |
| Distillation range, ° C. | 180 to 350 |
| S, wt % | 1.2 |
| N, wt % | 0.07 |
| Aromatic content, wt % | 69 |
| Cetane number | 20 |

TABLE 3

| Catalyst | C-1 | C-2 | C-3 | C-4 | C-5 | C-6 | C-7 |
|---|---|---|---|---|---|---|---|
| Reaction temperature, ° C. | 396 | 394 | 398 | 393 | 400 | 397 | 400 |
| Reaction pressure, MPa | 8.0 | 8.0 | 8.0 | 8.0 | 8.0 | 8.0 | 8.0 |
| Volumetric space velocity in cracking section, h⁻¹ | 2.0 | 2.0 | 2.0 | 2.0 | 2.0 | 2.0 | 2.0 |
| Volume ratio of hydrogen/oil | 1200 | 1200 | 1200 | 1200 | 1200 | 1200 | 1200 |
| Operation time, h | 300 | 300 | 300 | 300 | 300 | 300 | 300 |
| Nitrogen content in inputted material in cracking section, ppm | 30 | 30 | 30 | 30 | 30 | 30 | 30 |
| Single-pass conversion, % | 70 | 70 | 70 | 70 | 70 | 70 | 70 |
| Chemical hydrogen consumption, % | 3.35 | 3.38 | 3.32 | 3.39 | 3.37 | 3.38 | 3.36 |

| Catalyst | B-1 | B-2 | B-3 | B-4 | B-5 |
|---|---|---|---|---|---|
| Reaction temperature, ° C. | 390 | 410 | 391 | 403 | 390 |
| Reaction pressure, MPa | 8.0 | 8.0 | 8.0 | 8.0 | 8.0 |
| Volumetric space velocity in cracking section, h⁻¹ | 2.0 | 2.0 | 2.0 | 2.0 | 2.0 |
| Volume ratio of hydrogen/oil | 1200 | 1200 | 1200 | 1200 | 1200 |
| Operation time, h | 300 | 300 | 300 | 300 | 300 |
| Nitrogen content in inputted material in cracking section, ppm | 30 | 30 | 30 | 30 | 30 |

TABLE 3-continued

| | | | | | |
|---|---|---|---|---|---|
| Single-pass conversion, % | 70 | 70 | 70 | 70 | 70 |
| Chemical hydrogen consumption, % | 3.52 | 3.44 | 3.52 | 3.42 | 3.52 |

TABLE 4

| Catalyst | C-1 | C-2 | C-3 | C-4 | C-5 | C-6 | C-7 |
|---|---|---|---|---|---|---|---|
| Product distribution, wt % | | | | | | | |
| $C_5$ to 210° C. gasoline fraction | 61.2 | 61.0 | 61.8 | 59.2 | 59.7 | 60.2 | 61.0 |
| >210° C. diesel fraction | 30 | 30 | 30 | 30 | 30 | 30 | 30 |
| Liquid yield of $C_5^+$ fraction | 91.2 | 91.0 | 91.8 | 89.2 | 89.7 | 90.2 | 91.0 |
| Product properties Naphtha (<210° C.) | | | | | | | |
| Octane number | 86.9 | 86.0 | 88.0 | 86.4 | 87.0 | 85.8 | 88.0 |

| Catalyst | B-1 | B-2 | B-3 | B-4 | B-5 |
|---|---|---|---|---|---|
| Product distribution, wt % | | | | | |
| $C_5$ to 210° C. gasoline fraction | 55.7 | 53.0 | 55.8 | 52.6 | 55.8 |
| >210° C. diesel fraction | 30 | 30 | 30 | 30 | 30 |
| Liquid yield of $C_5^+$ fraction | 85.7 | 83.0 | 85.8 | 82.6 | 85.8 |
| Product properties Naphtha (<210° C.) | | | | | |
| Octane number | 80.7 | 89.6 | 80.9 | 89.8 | 80.9 |

TABLE 5

| Catalyst | C-1 | B-1 |
|---|---|---|
| Reaction temperature, ° C. | 402 | 406 |
| Reaction pressure, MPa | 8.0 | 8.0 |
| Volumetric space velocity in cracking section, $h^{-1}$ | 2.0 | 2.0 |
| Volume ratio of hydrogen/oil | 1200 | 1200 |
| Operation time, h | 2000 | 2000 |
| Nitrogen content in inputted material in cracking section, ppm | 30 | 30 |
| Single-pass conversion, % | 70 | 70 |
| Chemical hydrogen consumption, % | 3.22 | 3.46 |
| Product distribution, wt % | | |
| $C_5$ to 210° C. gasoline fraction | 63.8 | 61.5 |
| >210° C. diesel fraction | 30 | 30 |
| Liquid yield of $C_5^+$ fraction | 93.8 | 91.5 |
| Product properties Naphtha (<210° C.) | | |
| Octane number | 93.3 | 90.5 |

It can be seen from the above examples, comparative examples, and Tables 1-5: the catalysts obtained in the examples have better acidity distribution, such as a higher ratio of total acid/strong acid, and can achieve higher gasoline yield and total liquid yield than the catalysts obtained in the comparative examples, as indicated by the results of evaluation tests.

In the comparative example 4, the hydrocracking catalyst is prepared with the method in the prior art, wherein, in the decarburization process in the step (4), roasting is carried out for a short time at a high temperature in an atmosphere with high oxygen content; that process can only burn off the carbon deposit on the surface layer of the carbonized support, but can't realize appropriate decarburization and adjustment of acidity distribution in the support to rational acidity distribution, when compared with the method in the present invention. In the obtained hydrocracking catalyst, the ratio of total acid/strong acid is only 12.0, much lower than that in the hydrocracking catalysts obtained in the examples. Consequently, both the gasoline yield and the total liquid yield are inferior to those achieved by the hydrocracking catalysts obtained in the examples, as indicated by the results of the evaluation tests.

In the comparative example 5, the roasting in the step (5) is roasting at a high temperature in an oxygen-containing atmosphere; as a result, the shielding effect of carbon for the strong acid sites on the catalyst is lost. Consequently, the performance of the catalyst in the reaction is close to that of the catalyst without carbon deposit in the comparative example 1.

In the art, when a fresh catalyst is applied in a catalytic diesel oil hydrocracking reaction, the quality of the gasoline product generated by cracking is poor and the liquid yield of the apparatus is poor in the initial production stage. As the operation time of the apparatus extends, the quality of the gasoline product is improved gradually. Table 4 shows the evaluation results of a catalyst obtained in an example and a catalyst obtained in a comparative example after 300 h operation under the conditions shown in Table 3, wherein, the catalyst B-1 (the hydrocracking catalyst obtained in the comparative example 1) doesn't contain carbon when compared with the catalyst C-1 (the hydrocracking catalyst obtained in the example 1), and there is no acidity distribution adjustment step in the preparation process. As shown in the reaction results, though the reactivity of the catalyst C-1 is slightly lower than that of the catalyst B-1, the octane number of the gasoline product is 85 or higher, and the liquid yield of $C_5^+$ fraction is 89% or higher, obviously higher than those achieved by the catalyst B-1 (80.7 octane number, and 85.7% liquid yield of $C_5^+$ fraction).

Table 5 shows the evaluation results of the catalysts C-1 and B-1 after 2,000 h operation. It can be seen that the deactivation rate of the catalyst C-1 is obviously decreased, when compared with the deactivation rate of the catalyst B-1. After 2,000 h operation, the activity of the catalyst C-1 is apparently higher than that of the catalyst B-1, and the octane number of gasoline product and the liquid yield of $C_5^+$ fraction are higher. Those results indicate that the catalyst provided in the present invention exhibit better operation stability. Compared with the catalyst B-1, the hydrocracking catalyst provided in the present invention has apparent advantages in terms of reactivity and total liquid yield of $C_5^+$ product when it is used in catalytic diesel oil hydrocracking for producing gasoline.

What is claimed is:

1. A hydrocracking catalyst, comprising a support, an active metal component, and carbon,
wherein, based on a total weight of the catalyst, a content of the support is 60 to 90 wt %, a content of the active metal component calculated in metal oxides is 15 to 40 wt %, and a content of carbon calculated in C element is 1 to 5 wt %;

wherein, measured with an infrared acidimetric estimation method, the catalyst has a total infrared acid of 0.4 to 0.8 mmol/g, an infrared acid amount of strong acid with desorption temperature greater than 350° C. of 0.08 mmol/g or lower, and a ratio of the total infrared acid amount to the infrared acid amount of strong acid with desorption temperature greater than 350° C. of 5 to 50, wherein metal in the active metal component is selected from the group consisting of VIII metal elements and VIB metal elements, and a content of the VIII metal elements calculated in metal oxides is 2 to 15 wt %, and the content of the VIB metal elements calculated in metal oxides is 10 to 30 wt %, wherein, on the surface of the catalyst, an atomic ratio of the VIII metal elements to Al is (0.2 to 0.5):1 and an atomic ratio of the VIB metal elements to Al is (0.4 to 0.8):1.

2. The catalyst according to claim 1, wherein the support is a silica-alumina support that contains a modified Y-type molecular sieve, and, based on the total weight of the support, the support contains 20 to 85 wt % modified Y-type molecular sieve and 15 to 80 wt % amorphous silica-alumina and/or alumina, wherein the modified Y-type molecular sieve is a Y-type molecular sieve modified by dealumination and silicon reinsertion and/or hydrothermal treatment of ammonium fluosilicate, and a molar ratio of $SiO_2/Al_2O_3$ in the modified Y-type molecular sieve is (5 to 15):1.

3. The catalyst according to claim 1, wherein the content of carbon calculated in C element is 1 to 3 wt %, the total infrared acid amount is 0.4 to 0.6 mmol/g and the ratio of the total infrared acid amount to the infrared acid amount of strong acid with desorption temperature greater than 350° C. is 8 to 30.

4. The catalyst according to claim 1, having a specific surface area of 200 to 400 m²/g, and a pore volume of 0.25 to 0.38 ml/g.

5. A method for preparing a hydrocracking catalyst, comprising the following steps:
(1) contacting a support with a carbon source and causing a carbon deposition reaction to obtain a carbonized support;
(2) roasting the carbonized support in an oxygen-containing gas at 250° C. to 390° C. for 3.5 to 20 hrs. to obtain a decarbonized support, wherein a carbon content in the decarbonized support is 20 to 80% of a carbon content in the carbonized support, wherein the oxygen content in the oxygen-containing gas is 0.5 to 8 vol. %;
(3) introducing a precursor of active metal component into the decarbonized support, and drying the decarbonized support; and
(4) treating the product obtained in step (3) through a heat treatment process, in which the precursor of active metal component is converted into active metal oxides;

wherein the hydrocracking catalyst contains 1 to 5 wt % carbon calculated in C element, 60 to 90 wt % support, and 15 to 40 wt % active metal component calculated in metal oxides, wherein, in step (1), the sub-step of contacting the support with the carbon source is carried out at a pressure of 0.1 to 1MPa for 0.1 to 6 hrs., the carbon deposition reaction is carried out in an oxygen-containing atmosphere at 100° C. to 500° C. for 20 to 200 hrs., wherein an oxygen content of the oxygen-containing atmosphere is 10 to 100 vol. %.

6. The method according to claim 5, wherein the support is a silica-alumina support that contains a modified Y-type molecular sieve, and, based on the total weight of the support, the support contains 20 to 85 wt % modified Y-type molecular sieve and 15 to 80 wt % amorphous silica-alumina and/or alumina; wherein the modified Y-type molecular sieve is a Y-type molecular sieve modified by dealumination and silicon reinsertion and/or hydrothermal treatment of ammonium fluosilicate, and a molar ratio of $SiO_2/Al_2O_3$ in the modified Y-type molecular sieve is (5 to 15):1.

7. The method according to claim 6, wherein, in step (1), the support is obtained by mixing the modified Y-type molecular sieve with amorphous silica-alumina and/or alumina homogeneously, extruding the mixture into strips, and then drying and roasting the strips.

8. The method according to claim 5, wherein the carbon source is selected from the group consisting of petroleum ether, benzene, methyl benzene, dimethyl benzene, catalytic gasoline, coker gasoline, butadiene, pentylene, hexadiene, butylene, pentene, heptylene, nonylene, and mixtures thereof.

9. The method according to claim 5, wherein, in step (2), the oxygen-containing gas comprises 2 to 5 vol % of oxygen and at least one selected from the group consisting of $CO_2$, $N_2$, He, Ne, and Ar.

10. The method according to claim 5, wherein, in the step (2), the carbonized support is loaded into a roasting furnace and heated up from room temperature to the roasting temperature at a heating rate of 20 to 40° C./hr, and kept at the roasting temperature for the duration of the roasting time, the and a volume ratio of the oxygen-containing gas to the carbonized support is (500 to 5,000):1.

11. The method according to claim 5, wherein, in step (3), the precursor of active metal component is introduced by impregnating the decarbonized support in an impregnation liquid that contains the precursor of active metal component and wherein the drying is carried out at 90° C. to 150° C. for 2 to 8 hrs.

12. The method according to claim 5, wherein the heat treatment process comprises roasting the product obtained from step (3) in an inert gas at 400° C. to 700° C. for 2 to 10 hrs to obtain the hydrocracking catalyst.

13. The method according to claim 5 wherein the heat treatment process comprises activating the product obtained from step (3) in an oxygen-containing atmosphere at 150° C. to 300° C. for 1 to 5 hrs to obtain the hydrocracking catalyst.

* * * * *